(12) United States Patent
Pepka

(10) Patent No.: US 9,457,635 B2
(45) Date of Patent: Oct. 4, 2016

(54) MAGNETIC DAMPER

(75) Inventor: Charles F. Pepka, Renton, WA (US)

(73) Assignee: Renton Coil Spring Company, Renton, WA (US)

( * ) Notice: Subject to any disclaimer, the term of this patent is extended or adjusted under 35 U.S.C. 154(b) by 124 days.

(21) Appl. No.: 13/825,257

(22) PCT Filed: Sep. 23, 2011

(86) PCT No.: PCT/US2011/053065
§ 371 (c)(1),
(2), (4) Date: Sep. 30, 2013

(87) PCT Pub. No.: WO2012/040618
PCT Pub. Date: Mar. 29, 2012

(65) Prior Publication Data
US 2014/0015180 A1 Jan. 16, 2014

Related U.S. Application Data

(60) Provisional application No. 61/385,944, filed on Sep. 23, 2010.

(51) Int. Cl.
*F16F 15/03* (2006.01)
*B60G 13/02* (2006.01)
(Continued)

(52) U.S. Cl.
CPC ............. *B60G 13/02* (2013.01); *B60G 15/04* (2013.01); *B60G 17/06* (2013.01); *F16F 6/005* (2013.01); *F16F 7/00* (2013.01); *F16F 15/03* (2013.01)

(58) Field of Classification Search
CPC ........ F16F 15/03; F16F 15/035; F16F 15/06; F16F 15/067; F16F 7/116; F16F 2222/06; F16F 2222/08; B60G 17/019
USPC ................ 188/267, 380, 287, 159
See application file for complete search history.

(56) References Cited

U.S. PATENT DOCUMENTS 2,636,139 A * 4/1953 Winget .................. 310/105
2,906,899 A * 9/1959 Geneslay ................ 310/93
(Continued)

FOREIGN PATENT DOCUMENTS

DE 19647031 5/1997
DE 19621700 A1 * 12/1997
(Continued)

OTHER PUBLICATIONS

JP 61012440 A. Takashi Suzuki, Jan. 1986. English-language translation.*

Primary Examiner — Bradley King
Assistant Examiner — Stephen Bowes
(74) Attorney, Agent, or Firm — Lowe Graham Jones PLLC

(57) ABSTRACT

Apparatus, systems, and methods for damping movement of a first mass relative to a second mass by magnetically generating induced current are provided. A magnet is coupled to one mass and a nonferrous metallic member is coupled to another mass that moves relative to the first mass. First and second springs are coupled to opposing ends of the magnet, the magnet being positioned between the springs. A guide member channels the magnet as it moves relative to the nonferrous member, the magnet being slidable along the guide member. The magnet is in close proximity to the nonferrous metallic member as the magnet moves. Upon causing movement of the magnet by either mass, the magnet generates an electrical current in the nonferrous metallic member that induces a counter magnetic field that opposes the magnetic field generated by the current to damp movement of the magnet as it moves.

45 Claims, 9 Drawing Sheets

(51) Int. Cl.
  *F16F 6/00* (2006.01)
  *B60G 15/04* (2006.01)
  *B60G 17/06* (2006.01)
  *F16F 7/00* (2006.01)

(56) References Cited

U.S. PATENT DOCUMENTS

| | | | |
|---|---|---|---|
| 5,392,881 A * | 2/1995 | Cho et al. .................. | 188/267 |
| 7,308,975 B2 * | 12/2007 | Nehl et al. .................. | 188/267 |
| 2002/0017749 A1 * | 2/2002 | Fujita ..................... | F16F 3/026 |
| | | | 267/140.15 |
| 2005/0016802 A1 * | 1/2005 | Akami et al. ............... | 188/267 |
| 2007/0039791 A1 * | 2/2007 | Krefeld .................... | 188/316 |
| 2007/0175716 A1 * | 8/2007 | Kim et al. .................. | 188/267 |

FOREIGN PATENT DOCUMENTS

| | | | | |
|---|---|---|---|---|
| DE | 19840357 A1 | * | 11/1999 | ............ B60G 17/01 |
| DE | 102008045973 | | 9/2009 | |
| EP | 1172581 | | 1/2002 | |
| FR | 1000613 A | * | 2/1952 | ............ B60G 13/00 |
| FR | 67893 E | * | 3/1958 | ............ H02K 33/16 |
| GB | 806331 | | 12/1958 | |
| GB | 1511411 A | * | 5/1978 | |
| JP | S57137737 | | 8/1982 | |
| JP | 57167548 A | * | 10/1982 | ............ F16F 15/02 |
| JP | 61012440 A | * | 1/1986 | ............ B60K 25/04 |
| JP | S6376933 | | 4/1988 | |
| JP | H01108431 | | 4/1989 | |
| JP | 02209638 A | * | 8/1990 | ............... F16F 6/00 |

* cited by examiner

MAGNETIC DAMPER

PRIORITY CLAIM

This application is a national phase of PCT/US2011/053065 filed on Sep. 23, 2011, which claims priority to U.S. Provisional Application No. 61/385,944 filed on Sep. 23, 2010 entitled "Magnetic Damper" which is herein incorporated by reference in its entirety.

FIELD OF THE INVENTION

The present invention relates to damping systems such as shock absorbers, and more particularly, to a new magnetic damping system for resisting movement through generating induced currents.

BACKGROUND OF THE INVENTION

Existing damping systems typically employ a piston in a cylinder containing fluid to absorb shock. These hydraulic systems have multiple moving parts and valves. After extended periods of use, however, these systems are susceptible to fatigue and deterioration, causing problems of noise, short life, and leakage. Many hydraulic systems utilizing complex valve systems suffer from the ability to quickly absorb pressure "spikes" and consequent harshness of ride and movement. Furthermore, leaks and broken seals can contribute to breakdown of the system while in motion. This could cause damage to the system and serious bodily harm to an operator.

Because of the numerous, complex moving parts in existing systems, they operate under high temperatures due to friction, therefore causing greater fatigue and deterioration. Many shock absorbing systems, including simple spring systems, lack the capability to provide variable resistance control to movement depending upon a desired resistance at particular moments of force. Existing systems that can provide variable control resistance include complex valve mechanisms and moving parts that suffer from the same problems.

Thus, there are unmet needs in the art for damping movement. The present invention provides a magnetic damping system that generates an induced current to mitigate or obviate the aforementioned problems.

SUMMARY OF THE INVENTION

Embodiments of the present invention provide apparatus, systems, and methods to magnetically damp movement of a first mass relative to a second mass. The present invention may be used in any number of applications requiring damping of movement due to vibrations or oscillations, such as shock absorbers for automotive vehicles, bicycles, and aircraft, or in industrial applications. The invention generates a magnetically induced current to damp movement of a nonferrous metallic member as it moves relative to a ferrous member. The invention further provides a system for variable resistance control of movement, whether by altering the magnetic properties of the metallic members or by including an electromagnet to vary the damping effect to movement. As a result, the invention provides a magnetic damping system that does not require the use of fluids and numerous, complex moving parts, thereby reducing friction, noise, and fatigue rate.

More particularly, embodiments of the invention provide a system and method that utilizes magnetic electromotive force to generate an electrical current that induces a counter magnetic field that opposes the magnetic field generated by the current (known as "induced current") to damp movement of the first mass as it moves relative to the second mass. This is accomplished by providing a nonferrous metallic member coupled to the first mass, the member having at least one surface with a first axis. A magnet is coupled to the second mass and movable relative to the nonferrous metallic member along an axis substantially coincident with at least a portion of the first axis when the first mass moves relative to the second mass, wherein the magnet being in close proximity to the nonferrous metallic member. When the magnet moves relative to the nonferrous metallic member, an induced current is generated by the magnet in the nonferrous metallic member to provide resistance to movement of the magnet, thereby causing resistance to movement of the first mass relative to the second mass.

In one aspect of this preferred embodiment, a first compressible element is coupled at its proximal end to one end of the magnet and a second compressible element is coupled at its proximal end to the other end of the magnet. The compressible elements may be coil springs or other members capable of compression and providing resistance to movement. The distal end of the second compressible element is coupled to the second mass and the distal end of the first compressible element is coupled to the first mass. The first and second compressible elements and the magnet are movable along an axis substantially coincident with at least a portion of the first axis of the nonferrous metallic member. In one embodiment, the nonferrous metallic member is a cylindrical tube and the magnet is cylindrical in shape. However, the nonferrous metallic member and the magnet may be any suitable shape or size to accomplish the magnetic damping effect, such as a rectangular, square, or coned shaped.

The magnet comprises a permanent magnet, a temporary magnet, or an electromagnet. In an alternate embodiment, the magnet may be a weight with magnetic elements secured to the perimeter of the weight and in close proximity to the nonferrous metallic member. A guide member selectively engages the magnet and is coupled to the first mass at a proximal end and extends the length of the nonferrous metallic member about the first axis. The guide member may also extend beyond the nonferrous metallic member. The guide member extends through a hole in the magnet though its central axis, whereby the magnet slidably receives the guide member to maintain a constant position of the magnet as it moves. To reduce friction, a bushing may be secured to the hole of the magnet and positioned between the guide member and the magnet. The guide member is a cylindrical rod that provides a positioning and guide means to the magnet as it moves, but the guide member may be other means of positioning, such as rails or cables selectively engaged to the magnet and coupled to the nonferrous metallic member or the first mass. It may also be sufficient to use the compressible elements to position and guide the magnet.

When the magnet is moved by the second compressible element due to a force applied by the second mass or the first mass, the magnet slides along the guide member in a lateral direction relative to the first axis of the nonferrous metallic member. Movement of the magnet generates an electrical current in the nonferrous metallic member, thereby inducing a counter magnetic field that opposes the magnetic field generated by the magnet (the aforementioned "induced current"), thereby damping movement of the first mass relative to the second mass. The current is induced in-part because of the close proximity of the magnet to the inner wall of the nonferrous metallic member, thereby creating a gap. In an alternate embodiment, the area of the gap may be varied depending upon the characteristics and the magnetic properties of the magnet and the nonferrous metallic member. For example, the strength of the magnetic force provided by the magnet may increase the induced current, thereby causing an increased damping effect. Additionally, the shape of the nonferrous metallic member and the magnet may permit a varying area of the gap while still accomplishing the magnetic damping effect described herein in order to vary the resistance to movement.

In an alternate embodiment, the magnetic damping effect can be accomplished without the inclusion of the compressible elements into the system. For example, an induced current or magnetic field may produce sufficient forces to entirely damp movement of the magnet as it nears the first mass upon an extraordinary force, thereby not requiring a compressible member between the second mass and the magnet. Similarly, the magnet may merely utilize magnetic forces to maintain its position as it freely moves relative to the nonferrous metallic member. It will be appreciated in the embodiments described above that movement of the magnet is not required to occur in a single plane; the magnet and the nonferrous metallic member may be formed in an arc or other nonlinear arrangement while still accomplishing the magnetic damping effect described herein.

In an alternate embodiment, the inner wall of the nonferrous metallic member may be nonlinear to provide variable resistance to movement by virtue of the changing area of the gap when the magnet is displaced. The diameter at one end of the nonferrous metallic member may be larger or smaller than the diameter at the opposite end. With a nonlinear wall of the nonferrous metallic member, as the magnet is displaced along the guide member in either lateral direction, the area of the gap changes between the magnet and the nonferrous metallic member. Changing the area of the gap provides a variable damping effect because, as the area of the gap increases by virtue of movement in one direction, the amount of magnetically induced current proportionately decreases, thereby decreasing the resistance to movement of the first mass relative to the second mass. The opposite holds true. As the area of the gap decreases by virtue of movement in the opposite direction, the magnetically induced current increases, thereby resulting in an increasing the resistance to movement proportionate to the decreasing area of the gap. Tapering the diameter of the nonferrous metallic member in this manner in either direction allows the magnet to provide a greater damping force at a desired position along the nonferrous metallic member, such as if a greater damping resistance is desired at one end of the nonferrous metallic member.

In an alternate embodiment, the wall of the nonferrous metallic member has varying thickness to provide variable damping effect of movement. The wall of the nonferrous metallic member has a first thickness at opposing ends, and a second thickness at the central portion, the second thickness being greater than the first thickness. This difference in thicknesses of the wall throughout the length of the nonferrous metallic member provides a variable damping effect as the magnet is displaced.

In an alternate embodiment, the nonferrous metallic member includes a plurality of members coupled to the first mass and extending therefrom to surround the magnet, the compressible members, and the guide shaft. The members may be substantially equivalent in size and shape and equally separated from one another. This configuration continues to provide the aforementioned magnetic damping effect to movement of the first mass relative to the second mass through generating the induced current by the magnet in the nonferrous metallic member. This configuration provides a lighter weight damping system because it uses less material. It further provides the advantage of allowing ambient gas or liquids to freely disperse around the components of the system to provide minimal interference to the damping system, such as needed in underwater applications or pressurized environments. It will be appreciated that any amount of nonferrous metallic members and shapes may be incorporated into the system in various configurations while still accomplishing the damping effect described above.

In one preferred embodiment, the invention provides a system and method that generates magnetically induced current through an inverse configuration of the ferrous and nonferrous members of the embodiments described above. More specifically, this preferred embodiment provides a nonferrous metallic component (such as an aluminum cylindrical piston) coupled to the compressible members as described above, and movable relative to a metallic member (such as a cylindrical pipe), the metallic member including a ferrous element. The difference from the embodiment described above is that the ferromagnetic and nonferromagnetic properties of the corresponding members are swapped. The ferrous element of the metallic member may either comprise the metallic member (such as the metallic pipe having magnetic properties) or the ferrous element may be an element secured to the metallic member (such as a permanent or temporary magnet or an electromagnet). This inversed configuration accomplishes the aforementioned magnetically induced damping effect to provide resistance to movement of the first mass relative to the second mass.

An electromagnetic is coupled to the perimeter the metallic member and to a resistance control system by an electrical connection. The resistance control system comprises a mechanism and a control system coupled to one another. The mechanism is in communication with a first sensor coupled to the first mass and a second sensor coupled to the second mass. The sensors provide position and speed information of the first and second mass to the control system. It will be appreciate that any suitable sensors or mechanisms could be used to determine the position and speed of the masses relative to one another, such as position, proximity, pressure, and optical sensors. An accelerometer may alternatively be included in the second mass or in the nonferrous metallic component, the accelerometer in communication with the control system to provide acceleration information. The control system includes an electrical control unit that receives said information from the sensors. The control system includes a preprogrammed computing mechanism to establish the relationship between the position and speed of the first mass relative to the second mass and to determine the amount of electrical current to supply to the electromagnet based upon said relationship. Upon supplying an electrical current, the electromagnet produces a magnetic field proportionate to the amount of electrical current supplied by the control system. Increasing the electrical current will produce a stronger magnetic field in a direction through the nonferrous metallic component that will generate a stronger current in the nonferrous metallic component, thereby providing a stronger damping effect as the first mass moves relative to the second mass. Conversely, decreasing the electrical current provided to the electromagnet will produce a weaker magnetic field that will generate a weaker current in the nonferrous metallic component, thereby providing a weaker damping effect. Accordingly, providing no electrical current to the electromagnet will eliminate any magnetic damping effect. By including the resistance control system described herein, this embodiment of the magnetic damping system is capable of controlling and varying the resistance to movement of the first mass relative to the second mass. It will be appreciated that the electromagnet may entirely replace the metallic member, thereby forming a cylindrical shape about the nonferrous metallic component and the compressible elements.

BRIEF DESCRIPTION OF THE DRAWINGS

Preferred and alternative examples of the present invention are described in detail below with reference to the following drawings.

DETAILED DESCRIPTION OF THE PREFERRED EMBODIMENTS

By way of overview, the present invention provides apparatuses, systems, and methods for magnetically damping movement of a first mass relative to a second mass. In one presently preferred embodiment, the invention generates magnetically induced current to damp movement of the first mass relative to the second mass. This is accomplished through causing movement of a nonferrous member about an axis of a ferrous member, wherein the nonferrous member is coupled to the first mass and the ferrous member is coupled to the second mass (or vice versa). Because the ferrous member and nonferrous member are in close proximity, upon movement an induced current is generated in the nonferrous member that damps movement of the ferrous member, consequently damping movement of the first mass relative to the second mass.

In another embodiment, the magnetically induced damping effect is accomplished through including an electromagnet to provide variable control over resistance to movement. A resistance control system is coupled to the electromagnet to regulate the amount of electrical current supplied to the electromagnet depending upon the position and speed of the first mass relative to the second mass. The resistance control system thereby controls the strength of the electromagnetic field generated by the electromagnet. Such configuration allows a variable resistance control to movement of the first mass relative to the second mass.

Figure 1A:
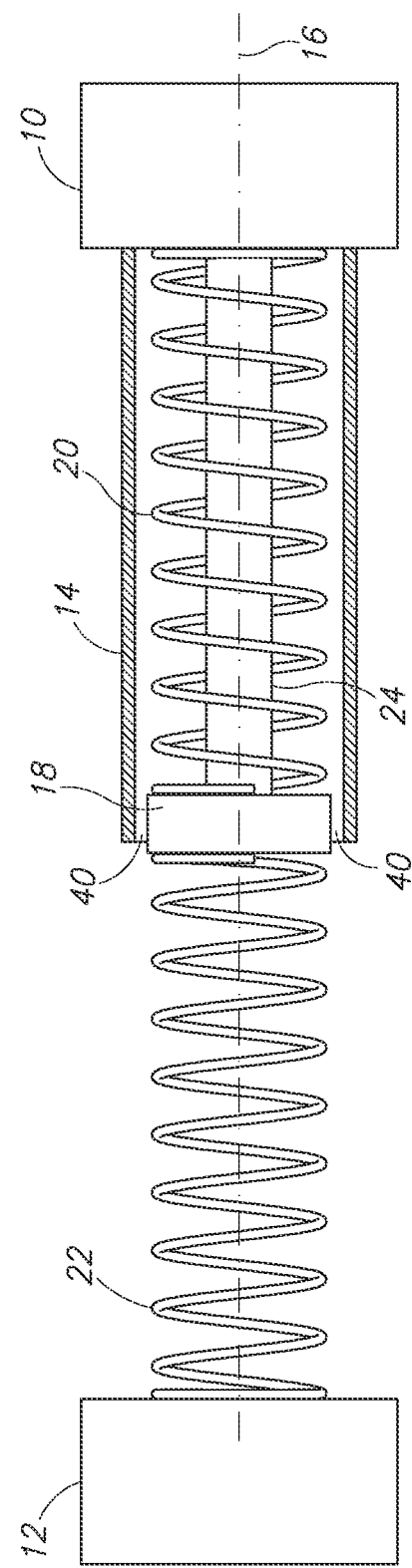
FIG. 1A is a side cutaway view of the magnetic damping system in an unloaded position.

FIG. 1A illustrates a system for damping movement of a first mass 10 relative to a second mass 12 according to a preferred embodiment of the present invention; the system being in an unloaded state. In a presently preferred embodiment, the system includes a nonferrous metallic member 14, such as the aluminum pipe shown, having a surface with a first axis 16, wherein nonferrous metallic member 14 is coupled to first mass 10. A magnet 18, a cylindrical plug having opposite ends, is coupled to the proximal end of a first compressible element 20 at one end of magnet 18. The opposing end of magnet 18 is coupled to the proximal end of a second compressible element 22. Alternatively, magnet 18 could be coupled to second mass 12 by a noncompressible member, such as a shaft/rod that oscillates as second mass 12 moves relative to first mass 10. The compressible members (e.g., springs) may be mounted completely separately from the magnetic damping system. In such an arrangement, the magnet is coupled to at least one mass with the nonferrous metallic member coupled to the other. However, in this preferred embodiment shown in FIG. 1A, first compressible element 20 is coupled at its distal end to first mass 10. First and second compressible elements 20 and 22 are coil springs as shown. Magnet 18 is positioned between first compressible element 20 and second compressible elements 22, all being movable relative to nonferrous metallic member 14 along an axis which is substantially coincident with at least a portion of first axis 16. As seen in exploded view of FIG. 2, Magnet 18, first compressible element 20, and second compressible element 22 are coaxial with one another.

Magnet 18 is a permanent magnet as shown, but may include any ferrous material or component capable of producing a magnetic field. The outer perimeter surface of magnet 18 is in close proximity to the inner wall of nonferrous metallic member 14, thereby creating a gap 40. Preferably, the outer perimeter surface of magnet 18 is substantially parallel to the first axis 16 of nonferrous metallic member 14.

Figure 2:
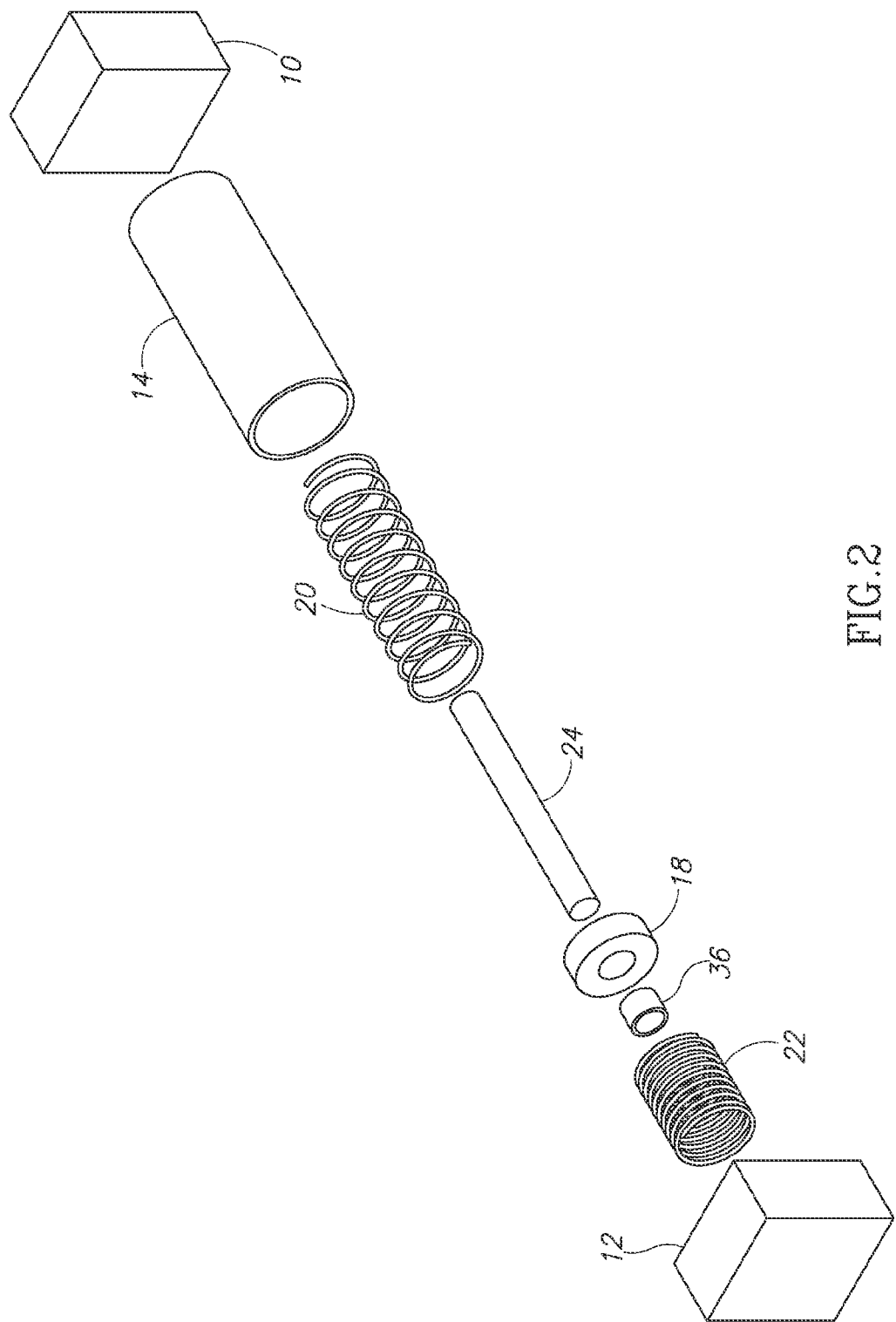
FIG. 2 is an exploded view of the magnetic damping system.

A guide member 24 is included in the system to maintain the position of magnet 18 as it moves relative to nonferrous metallic member 14. Guide member 24 is a solid cylindrical rod coupled to first mass 10 at its proximal end and spans the length of nonferrous magnetic member 14. Guide member 24 has a central axis that is substantially coincident with at least a portion of first axis 16. Magnet 18 has a hole 38, as shown in FIG. 2, extending through its central axis through which magnet 18 slidably receives guide member 24 to maintain a constant position of magnet 18 as it moves along axis 16. To reduce friction and maintain position, a bushing 36 is secured to magnet 18 in hole 38 and is positioned between guide member 24 and magnet 18. In the preferred embodiment shown, magnet 18, first compressible element 20, second compressible element 22, guide member 24, bushing 36, and hole 38 are substantially coaxial with one another and with first axis 16 of nonferrous metallic member 14.

Figure 1B:
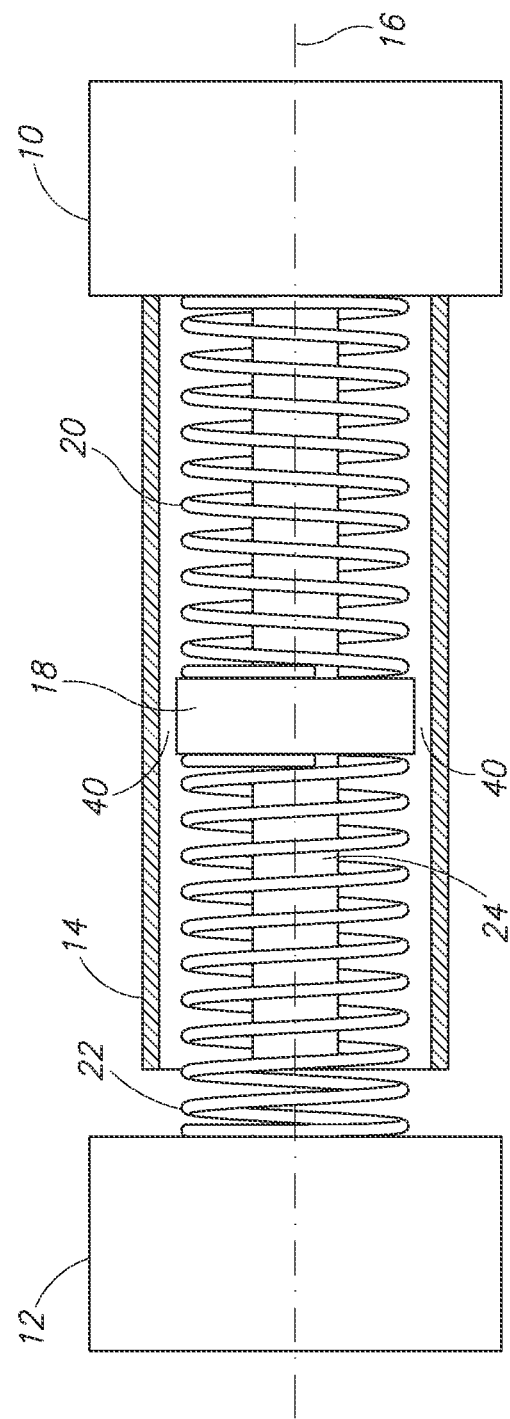
FIG. 1B is a side cutaway view of the magnetic damping system shown in FIG. 1A in a loaded position.

FIG. 1B illustrates the system of FIG. 1A in a loaded position, such that mass 12 has applied force to second compressible element 22, thereby displacing magnet 18 toward first mass 10 (alternatively, first mass 10 may be applying the force). As second mass 12 applies a force to second compressible element 22, thereby causing magnet 18 to slide along guide member 24 in a lateral direction toward first mass 10 and relative to first axis 16 of nonferrous metallic member 14, magnet 18 generates an magnetically induced current in nonferrous metallic member 14, thereby damping movement of magnet 18 and, consequently, movement of first mass 10 relative to second mass 12. This magnetic damping effect is accomplished due in part to the close proximity of magnet 18 to the inner wall of nonferrous metallic member 14 (creating the area of gap 40). In an alternate embodiment, the area of gap 40 may be varied depending upon the characteristics or properties of magnet 18 and the nonferrous metallic member 14. For example, the strength of the magnetic force provided by magnet 18 or the shape of nonferrous metallic member 14 may permit a larger or varying area of gap 40 while still accomplishing the magnetic damping effect described herein. In an alternate embodiment, nonferrous metallic member 14 is excluded from the system and guide member 24 is comprised of nonferrous metal, thereby acting as the member that receives the current from magnet 18 to damp movement of magnet 18.

Figure 1C:
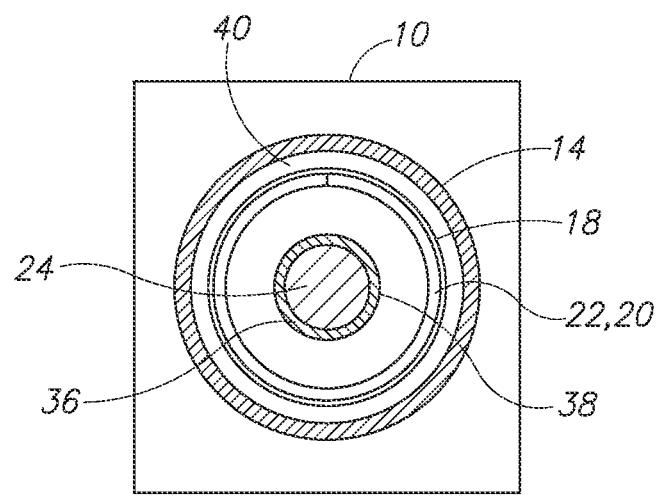
FIG. 1C is a front cutaway view of the magnetic damping system.

FIG. 1C is a front cutaway view of the magnetic damping system removed from second mass 12. In one presently preferred embodiment, this view shows the relationship of magnet 18 being separated uniformly from nonferrous metallic member 14 by the area of gap 40. It shows guide member 24 extending through hole 38 about the central axis of magnet 18. Bushing 36 is tightly secured to magnet 18 in hole 38, wherein the bushing slidably receives guide member 24 thereby permitting magnet 18 to freely move with reduced friction while maintaining position of magnet 18 relative to nonferrous metallic member 14. FIG. 1C and FIG. 2 illustrate the coaxial relationship of guide member 24, bushing 36, hole 38, magnet 18, compressible elements 20 and 22, and nonferrous metallic member 14.

Figure 3A:
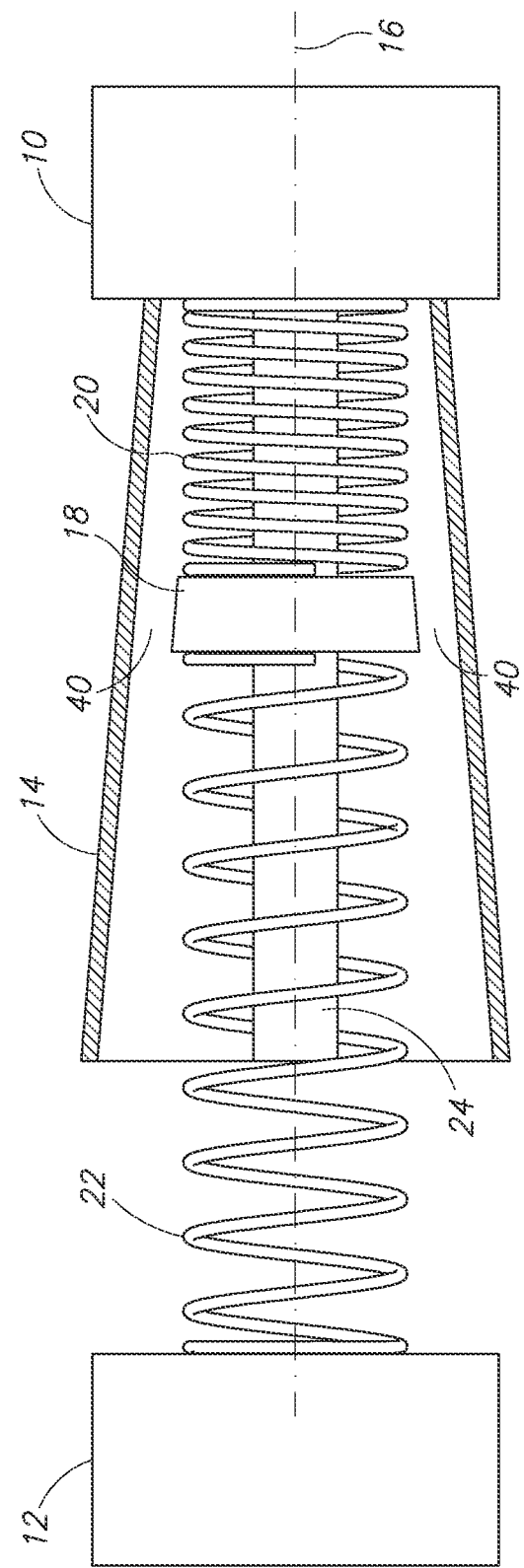
FIG. 3A is a side cutaway view of the magnetic damping system shown in FIG. 1A, the metallic member having a nonlinear shape.

FIG. 3A shows the magnetic damping system as shown in FIG. 1A and described above, wherein the inner surface of nonferrous metallic member 14 is nonlinear with respect to its first axis 16. In one presently preferred embodiment, the inner surface of nonferrous metallic member 14 tapers so that the distal end of the member has a diameter greater than the diameter of the proximal end that is coupled to the first mass 10. Accordingly, magnet 18 has the shape of a frustum of a cone, wherein the perimeter surface of magnet 18 is substantially parallel to the inner surface of nonferrous metallic member 14. It will be appreciated that magnet 18 may be a different shape than shown in this embodiment, such as a cylinder, as long as it may freely move relative to nonferrous metallic member 14. As magnet 18 is displaced along guide member 24 in either longitudinal direction along axis 16, the area of gap 40 therefore changes. Changing the area of gap 40 as the magnet 18 moves provides a variable damping effect because, upon an increasing force by second mass 12 while magnet 18 moves toward first mass 10, the area of gap 40 decreases. As the area of gap 40 decreases, magnet 18 and nonferrous metallic member 14 become in closer proximity, thereby increasing the amount of induced current generated. This increasing induced current in nonferrous metallic member 14 results in a damping resistance force that progressively increases in proportion to the changing area of gap 40. The opposite holds true. As second mass 12 provides a decreasing force on magnet 18, causing magnet 18 to be displaced away from first mass 10, the area of gap 40 increases between magnet 18 and nonferrous metallic member 14. Consequently, the magnetically induced current decreases, thereby resulting in a damping resistance force progressively decreasing in proportion to the changing area of gap 40. In an alternate embodiment, the inverse configuration of the tapering diameter shown in FIG. 3A is possible, such that the diameter of nonferrous metallic member 14 tapers in the opposite direction. Tapering the diameter of nonferrous metallic member 14 in either direction as described allows magnet 18 to provide a greater damping force at a desired position as first mass 10 moves relative to second mass 12. In alternate embodiments, the taper does not have be consistent. For example, it may decrease then increase, then decrease again. In one embodiment, for example, the gap 40 may be small to resist mass 10 moving toward mass 12 during the initial stroke. Once the initial travel is complete the gap 40 may increase to allow freer movement of the masses toward each other. Then the gap can decrease again to help guard against a "bottom-out" condition in which the springs fully compress or the guide member 24 impacts mass 12.

Figure 3B:
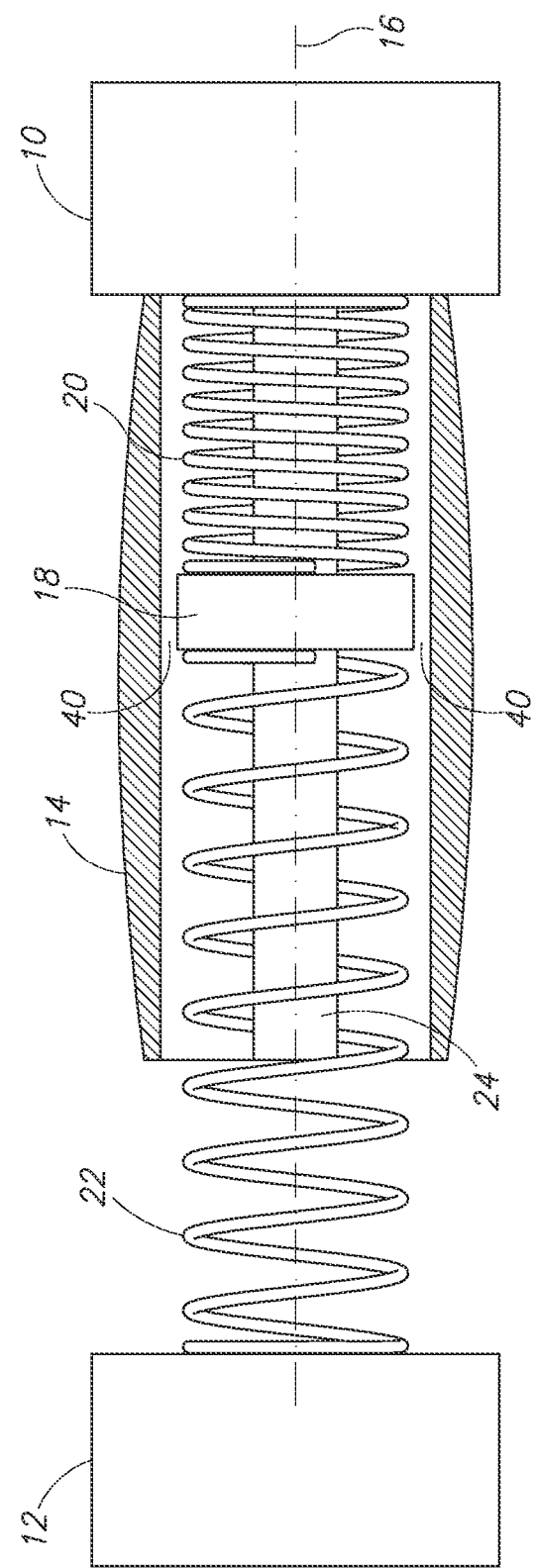
FIG. 3B is a side cutaway view of the magnetic damping system shown in FIG. 1A, the walls of the metallic member wall having a varying thickness.

FIG. 3B illustrates the magnetic damping system shown in FIG. 1A and described above, wherein the wall of nonferrous metallic member 14 has a varying thickness. The configuration shown provides another embodiment of varying damping effect of movement of first mass 10 relative to second mass 12. This is accomplished because the wall of nonferrous metallic member 14 has a first thickness at the proximal end and the distal end, the proximal end coupled to first mass 10. The wall then has a second thickness at the central portion of nonferrous metallic member 14, the second thickness being greater than the first thickness. This difference in thicknesses of the wall throughout the length of nonferrous metallic member 14 provides a variable damping effect as magnet 18 is displaced.

Figure 3C:
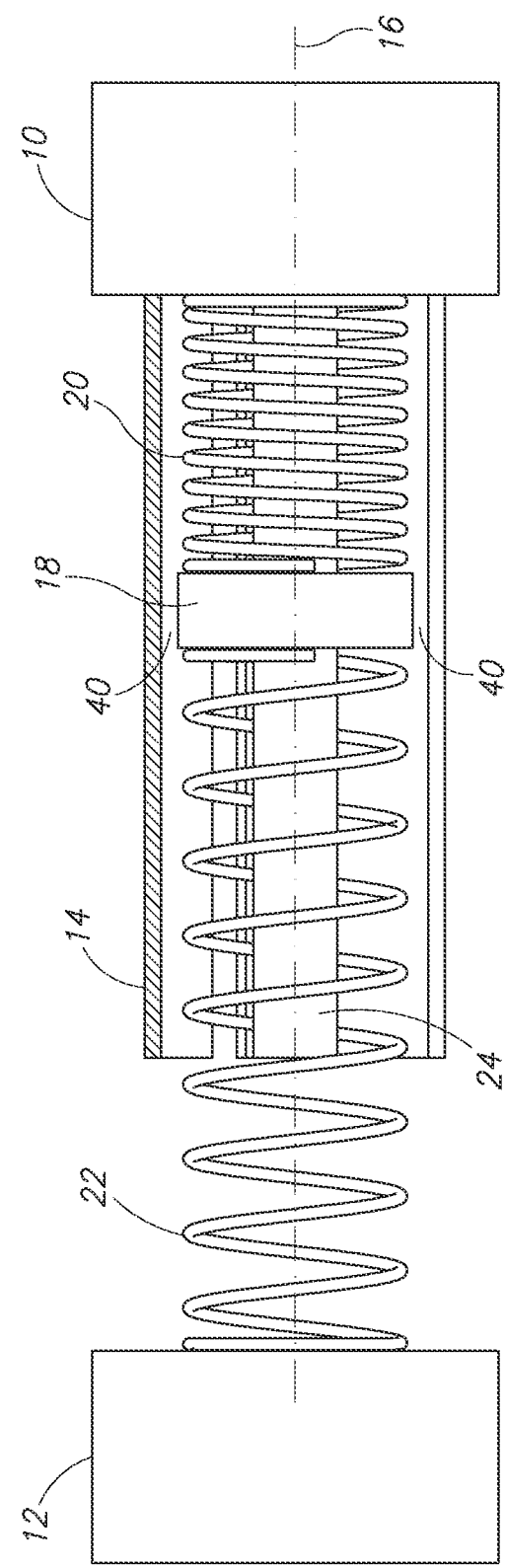
FIG. 3C is a side cutaway view of the magnetic damping system, the metallic member having a plurality of members.
Figure 3D:
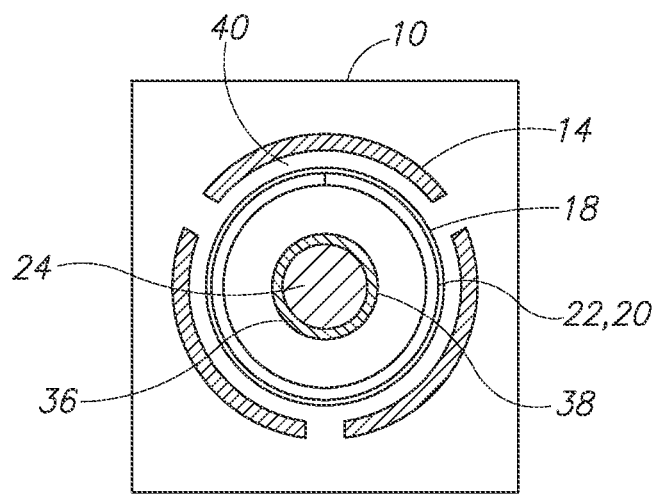
FIG. 3D is a front cutaway view of the magnetic damping system shown in FIG. 3C.

FIGS. 3C and 3D illustrate the magnetic damping system shown in FIG. 1A and described above, wherein nonferrous metallic member 14 comprises a plurality of nonferrous metallic members coupled to first mass 10 as shown. The members form a cylindrical shape surrounding magnet 18, compressible members 20 and 22, and guide shaft 24. The members are substantially equivalent in size and shape and are equally separated from one another (see FIG. 3D for a cutaway front view of FIG. 3C). This configuration will provide the aforementioned magnetic damping effect to movement of first mass 10 relative to second mass 12 due to the current induced by displacing magnet 18 relative to the plurality of nonferrous metallic members 14. In an alternative embodiment, any amount of nonferrous metallic members and shapes may be incorporated into the system in various configurations while still accomplishing the magnetic damping effect described above. For example, members with rectangular cross sectional shapes may be used. Furthermore, the members may be discontinuous longitudinally.

Figure 4:
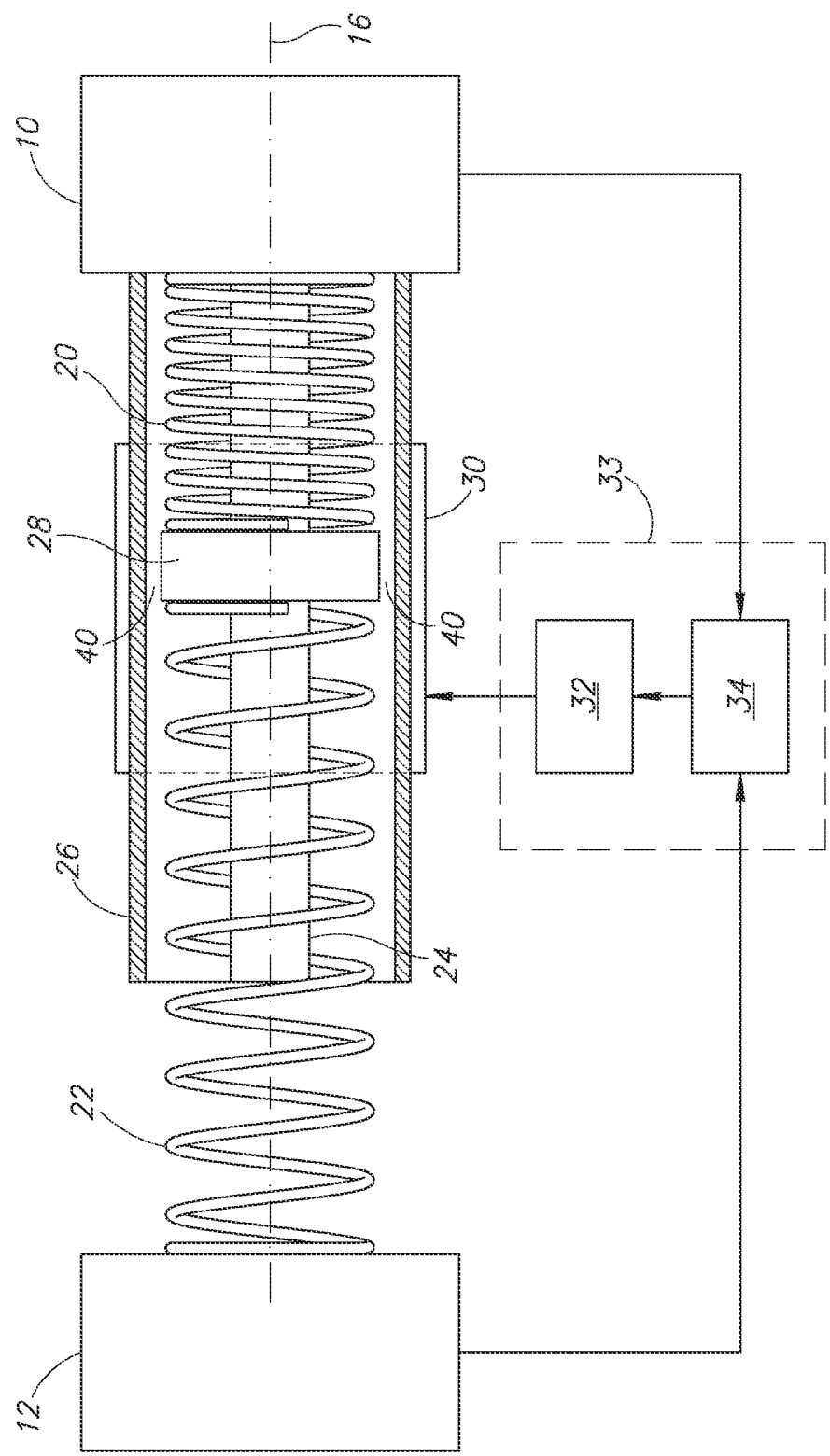
FIG. 4 is a side cutaway view of the magnetic damping system, the metallic member having a magnetic element which is an electromagnet.

FIG. 4 illustrates another embodiment of the magnetic damping system wherein the magnetically induced current is generated through an inverse configuration of the ferrous and nonferrous members of the embodiment described above in FIG. 1A. In the presently preferred embodiment, metallic member 14, having a surface with first axis 16, is coupled at the proximal end to first mass 10. A nonferrous metallic component 28 is a cylindrical plug having opposite ends and is coupled to the proximal end of second compressible element 22 at one end of nonferrous metallic component 28. The opposing end of nonferrous metallic component 28 is coupled to the proximal end of first compressible element 20. Nonferrous metallic component 28 is comprised of aluminum, but it may be comprised of any combination of nonferromagnetic material capable of transmitting an electrical current. Metallic member 14 includes a magnetic element, the magnetic element being electromagnet 30 coupled to the perimeter of metallic member 14. The sizes of the elements may differ than shown in FIG. 4. For example, the nonferrous metallic component 28 may be elongated while electromagnet 30 may only extend over a small portion of the length of nonferrous metallic component 28.

The magnetic damping system includes a resistance control system 33 that comprises a mechanism 34 and a control system 32 coupled to one another. Mechanism 34 is in communication with a first sensor coupled to first mass 10 (within schematic box "mass 10" shown in FIG. 4) and a second sensor coupled to second mass 12 (within schematic box "mass 12" shown in FIG. 4). The sensors provide position, speed, and acceleration information of first mass 10 and second mass 12 to control system 32. Control system 32 includes an electrical control unit that receives said information from the sensors, control system 32 including a preprogrammed computing mechanism to establish a predetermined relationship between the position, speed, and acceleration of first mass 10 relative to second mass 12. Control system 32 is coupled to electromagnet 30 by an electrical connection to provide electrical current to electromagnet 30. Based upon said predetermined relationship and a desired force of resistance, control system 32 regulates the amount of electrical current provided to electromagnet 30. Electromagnet 30 thereby produces a magnetic field that generates an induced current in nonferrous metallic component 28 proportionate to the amount of electrical current provided by control system 32. Increasing the electrical current provided to electromagnet 30 will produce a stronger magnetic field that will generate a stronger current in nonferrous metallic component 28, thereby providing a stronger damping effect on nonferrous metallic component 28 as it moves. Conversely, decreasing the electrical current provided to electromagnet 30 will produce a weaker magnetic field that will generate a weaker current in nonferrous metallic component 28, thereby providing a weaker damping effect. Accordingly, providing no electrical current to electromagnet 30 may eliminate the magnetic damping effect.

Embodiments of the present invention include the magnetic damping system and apparatus. Embodiments of the present invention also include a method of damping movement of a first mass relative to a second mass by generating a magnetically induced current as previously described in connection with FIGS. 1-4.

While the preferred embodiments of the invention have been illustrated and described, as noted above, many changes can be made without departing from the spirit and scope of the invention. For example, the manner in which in the magnetically induced current is generated to provide resistance to movement may vary depending on the ferromagnetic properties of a metallic member as it moves relative to another metallic member. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system for damping movement of a first mass relative to a second mass, the system comprising:
    a first compressible element that is coupled to the first mass;
    a second compressible element that is coupled to the second mass;
    a nonferrous metallic member having a surface, wherein the metallic member is coupled to the first mass; and
    a magnet coupled to the first and the second compressible elements such that the magnet is longitudinally intermediate the first and the second masses and disposed in close proximity to the surface of the nonferrous metallic member, wherein a longitudinal axis extends through the first mass and the second mass, and wherein the first compressible element, the second compressible element, the surface of the metallic member, and the magnet are substantially coaxial about the longitudinal axis, and wherein
    when there is a translation of the first mass relative to the second mass, the magnet translates along the longitudinal axis and relative to each of the surfaces of the nonferrous metallic member, the first mass, and the second mass such that an electrical current is induced in the nonferrous magnetic member, which damps the translation of the first mass relative to the second mass.

2. The system of claim 1, wherein the first compressible element and the magnet are translatable along the longitudinal axis.

3. The system of claim 1, wherein the magnet is positioned longitudinally between the first and the second compressible elements, whereby each of the first compressible element, the second compressible element, and the magnet is translatable along the longitudinal axis.

4. The system of claim 1, further comprising a guide member extending through a hole in the magnet.

5. The system of claim 1, wherein the magnet comprises at least one of a permanent magnet, a temporary magnet, or an electromagnet.

6. The system of claim 1, further comprising a guide member that is separate from the nonferrous metallic member, wherein the guide member engages the magnet, is coupled to at least one of the first mass or the second mass, and is substantially coaxial with the first compressible element, the second compressible element, the surface of the metallic member, and the magnet, wherein the magnet is slidable along the guide member as the magnet is translated.

7. The system of claim 1, wherein at least one surface of the nonferrous metallic member is nonlinear to provide variable resistance to movement when the magnet is displaced.

8. A system for damping movement of a first mass relative to a second mass, the system comprising:
    a ferrous member;
    a first compressible element that is coupled to the first mass at a distal end of the first compressible element and to the ferrous member such that the first compressible element is longitudinally intermediate the first mass and the ferrous member;
    a second compressible element that is coupled to the second mass at a distal end of the second compressible element and to the ferrous member such that the second compressible element is longitudinally intermediate the second mass and the ferrous member, the ferrous member is longitudinally intermediate the first mass and the second mass, and a longitudinal axis extends through the first mass and the second mass; and
    a nonferrous metallic component coupled to the second mass and positioned in close proximity to the ferrous member, and wherein
    when the first mass moves relative to the second mass, the nonferrous metallic component moves relative to the ferrous member and along the longitudinal axis and an induced electrical current is generated in the nonferrous metallic component that damps the movement of the first mass relative to the second mass.

9. The system of claim 8, wherein the ferrous member is an electromagnet, whereby when an electrical current passes through the electromagnet an electromagnetic field is generated through the nonferrous metallic component, thereby damping movement of the nonferrous metallic component to provide resistance to movement of the first mass relative to the second mass.

10. The system of claim 9 including a resistance control system comprising:
- a mechanism in communication with at least one of the first mass and the second mass for determining the position and speed of the first mass as it moves relative to the second mass; and
- a control system coupled to the mechanism, the control system having an electrical control unit for establishing a predetermined relationship between at least one of the position and speed of the first mass as it moves relative to the second mass, the control system being coupled to the electromagnet, wherein the control system regulates the amount of electrical current provided to the electromagnet to provide variable resistance control of movement.

11. The system of claim 10, wherein the first mass includes a first position sensor and the second mass includes a second position sensor, the sensors being in communication with the mechanism.

12. The system of claim 8, wherein the first compressible element and the nonferrous metallic component are movable along the longitudinal axis.

13. The system of claim 8, wherein the first compressible element, the second compressible element, and the nonferrous metallic component are movable along the longitudinal axis.

14. The system of claim 8, wherein at least one surface of the nonferrous metallic component is nonlinear to provide variable resistance to movement when the ferrous member is displaced.

15. The system of claim 8, wherein the nonferrous metallic component comprises a plurality of nonferrous metallic components.

16. The system of claim 8, wherein the nonferrous metallic component includes at least one of a cylindrical tube or a guide member extending through a hole in the ferrous member, and wherein the ferrous member is a cylindrical ferrous member.

17. The system of claim 8, wherein the ferrous member comprises at least one of a permanent magnet, a temporary magnet, or an electromagnet.

18. The system of claim 8, further comprising a guide member that is separate from the nonferrous metallic component, wherein the guide member engages the ferrous member, is coupled to at least one of the first mass or the second mass, and is substantially coaxial with the first compressible element, the second compressible element, the ferrous member, and the nonferrous metallic component, wherein the ferrous member is slidable along the guide member as the nonferrous metallic component is displaced by movement of the first mass relative to the second mass.

19. A shock absorbing apparatus for damping movement of a first mass of a vehicle relative to a second mass of the vehicle, the apparatus comprising:
- a first compressible element that is coupled to the first mass;
- a second compressible element that is coupled to the second mass;
- a nonferrous metallic member having a surface, wherein the metallic member is coupled to the first mass of the vehicle; and
- a magnet coupled to the first and the second compressible elements such that the magnet is longitudinally intermediate the first and the second masses and disposed in close proximity to the nonferrous metallic member, wherein a longitudinal axis extends through the first mass and the second mass and the first compressible element, the second compressible element, the surface of the metallic member, and the magnet are substantially coaxial about the longitudinal axis, and wherein when the first mass moves relative to the second mass, the magnet moves along the longitudinal axis and relative to each of the first mass, the second mass, and the nonferrous metallic member such that an electrical current is induced that provides damping to movement of the first mass relative to the second mass.

20. The apparatus of claim 19, wherein the first compressible element and the magnet are movable along the longitudinal axis.

21. The apparatus of claim 19, wherein the first compressible element, the second compressible element, and the magnet are movable along the longitudinal axis.

22. The apparatus of claim 19, wherein the nonferrous metallic member includes at least one of a cylindrical tube or a guide member extending through a hole in the magnet, and wherein the magnet is a cylindrical magnet.

23. The apparatus of claim 19, wherein the magnet comprises at least one of a permanent magnet, a temporary magnet, or an electromagnet.

24. The apparatus of claim 19, further comprising a guide member that is separate from the nonferrous metallic member, wherein the guide member engages the magnet, is coupled to at least one of the first mass or the second mass, and is substantially coaxial with the first compressible element, the second compressible element, the surface of the metallic member, and the magnet, wherein the magnet is slidable along the guide member as the magnet is displaced.

25. The apparatus of claim 19, wherein at least one surface of the nonferrous metallic member is nonlinear to provide variable resistance to movement as the magnet is displaced.

26. A method for damping movement of a first mass relative to a second mass, the method comprising:
- providing a first compressible element that is coupled to the first mass at a distal end of the first compressible element;
- providing a second compressible element that is coupled to the second mass at a distal end of the second compressible element;
- providing a nonferrous metallic member having a surface, wherein the nonferrous metallic member is coupled to the first mass;
- providing a magnet coupled to the first and second compressible elements such that the magnet is longitudinally intermediate the first and the second masses and a longitudinal axis extends through the first mass and the second mass, and wherein the magnet is positioned in close proximity to the nonferrous metallic member and is movable relative to the nonferrous metallic member; and
- moving the first mass relative to the second mass, thereby causing the magnet to move relative to each of the first mass, the second mass, and the nonferrous metallic member along the longitudinal axis to induce an electrical current that damps the movement of the first mass relative to the second mass.

27. The method of claim 26, wherein the nonferrous metallic member includes at least one of a cylindrical tube or a guide member extending through a hole in the magnet, and wherein the magnet is a cylindrical magnet.

28. The method of claim 26, wherein the magnet comprises at least one of a permanent magnet, a temporary magnet, or an electromagnet.

29. The method of claim 26, further comprises:
providing a guide member that is separate from the nonferrous metallic member and coupled to the first mass and being substantially coaxial with the first compressible element, the second compressible element, the surface of the metallic member, and the magnet; and
moving the second mass relative to the first mass, thereby sliding the magnet along the guide member relative to the nonferrous metallic member.

30. The method of claim 26, wherein at least one surface of the nonferrous metallic member is nonlinear to provide variable resistance to movement when the magnet is displaced by the second mass.

31. The method of claim 26, wherein the nonferrous metallic member includes a plurality of nonferrous metallic members.

32. A method for damping movement of a first mass relative to a second mass, the method comprising:
providing a ferrous member;
providing a first compressible element that is coupled to the first mass and to the ferrous member such that the first compressible element is longitudinally intermediate the first mass and the ferrous member such that the first mass is movable relative to the ferrous member;
providing a second compressible element that is coupled to the second mass and to the ferrous member such that the second compressible element is longitudinally intermediate the second mass and the ferrous member such that the second mass is movable relative to the ferrous member, the ferrous member is longitudinally intermediate the first mass and the second mass, and a longitudinal axis extends through the first mass and the second mass;
providing a nonferrous metallic component coupled to the second mass such that the first compressible element, the second compressible element, the metallic component, and the ferrous member are substantially coaxial about the longitudinal axis, wherein the nonferrous metallic component being positioned in close proximity to the ferrous member and movable relative to the ferrous member; and
moving the first mass relative to the second mass, thereby causing the nonferrous metallic component to move relative to the ferrous member along the longitudinal axis and inducing an electrical current that damps the movement of the first mass relative to the second mass.

33. The method of claim 32, further comprising:
providing the ferrous member as an electromagnet;
providing a resistance control system coupled to the electromagnet; and
transmitting an electrical current from the resistance control system to the electromagnet, thereby generating an electromagnetic field to provide resistance to movement of the nonferrous metallic member.

34. The method of claim 33, wherein the resistance control system comprises:
providing a mechanism in communication with a first sensor and a second sensor, the first sensor coupled to the first mass and the second sensor coupled to the second mass for determining the position and speed of the first mass and the second mass;
permitting communication between the mechanism and a control system, the control system having an electrical control unit for establishing a predetermined relationship between the position and speed of the first mass as it moves relative to the second mass; and
regulating the amount of electrical current provided to the electromagnet from the control system to provide variable resistance control of movement of the first mass relative to second mass.

35. The method of claim 33, wherein at least one surface of the nonferrous metallic component is nonlinear to provide variable resistance to movement when the ferrous member is displaced.

36. The method of claim 32, wherein the non-ferrous metallic component includes at least one of a tube or a guide member extending through a hole in the ferrous member, and wherein the nonferrous metallic component is a cylindrical component.

37. The method of claim 32, further comprising:
providing a guide member that is separate from the nonferrous metallic component, wherein the guide member engages the ferrous member is coupled to at least one of the first mass or the second mass, and is substantially coaxial with the first compressible element, the second compressible element, the ferrous member, and the nonferrous metallic component, wherein the ferrous member is slidable along the guide member as the nonferrous metallic component is displaced relative to the ferrous member.

38. A system for damping movement of a first mass relative to a second mass, the system comprising:
a nonferrous metallic member having a surface, wherein the nonferrous metallic member is coupled to the first mass;
a magnetic element that is disposed in close proximity to the nonferrous metallic member; and
a compressible element that is coupled to the magnetic element at a first end of the compressible element and to the second mass at an opposing end of the compressible element such that a longitudinal axis extends through the magnetic element and the second mass, the magnetic element is movable relative to each of the second mass and the nonferrous metallic member along the longitudinal axis, and the compressible element provides resistance to a movement between the magnetic element and the second mass, wherein the compressible element, the surface of the metallic member, and the magnetic element are substantially coaxial about the longitudinal axis, and
when the first mass moves relative to the second mass, the magnetic element moves relative to each of the second mass and the nonferrous metallic member and an electrical current is induced in the nonferrous metallic member that damps movement of the first mass relative to the second mass.

39. The system of claim 38, wherein the compressible element is a spring element.

40. A system for damping movement of a first mass relative to a second mass, the system comprising:
a first compressible element that is coupled to the first mass;
a second compressible element that is coupled to the second mass;
a nonferrous metallic member having a surface, wherein the metallic member is coupled to the first mass;
a magnet coupled to the first and the second compressible elements such that the magnet is longitudinally intermediate the first and the second masses and a longitudinal axis extends through the first mass and the second mass, wherein the first compressible element, the second compressible element, the surface of the metallic member, and the magnet are substantially coaxial about the longitudinal axis; and a guide member extending through a hole in the magnet, and wherein the magnet translates, relative to each of the surfaces of nonferrous metallic member, the first mass, and the second mass and, along the longitudinal axis when there is a translation of the first mass relative to the second mass, wherein the magnet is disposed in close proximity to the surface of the nonferrous metallic member, whereby when the magnet translates relative to the surface of the nonferrous metallic member, an induced electrical current is generated which provides resistance to the translation of the first mass relative to the second mass.

41. The system of claim 40, wherein the first compressible element and the magnet are translatable along the longitudinal axis.

42. The system of claim 40, wherein the magnet is positioned longitudinally between the first and the second compressible elements, whereby each of the first compressible element, the second compressible element, and the magnet is translatable along the longitudinal axis.

43. The system of claim 40, wherein the magnet comprises at least one of a permanent magnet, a temporary magnet, or an electromagnet.

44. The system of claim 40, wherein the guide member engages the magnet, the guide member coupled to at least one of the first mass or the second mass, the guide member being substantially coaxial with the first compressible element, the second compressible element, the surface of the metallic member, and the magnet, wherein the magnet is slidable along the guide member as the magnet is translated.

45. The system of claim 40, wherein the nonferrous metallic member includes a cylindrical tube and the magnet is a magnet.

* * * * *